(12) United States Patent
Fujita et al.

(10) Patent No.: US 6,241,059 B1
(45) Date of Patent: Jun. 5, 2001

(54) VIBRATION ISOLATOR HAVING MAGNETIC SPRINGS

(75) Inventors: Etsunori Fujita; Yutaka Sakamoto; Kazuyoshi Chizuka, all of Hiroshima (JP)

(73) Assignee: Delta Tooling Co., Ltd., Hiroshima (JP)

( * ) Notice: Subject to any disclaimer, the term of this patent is extended or adjusted under 35 U.S.C. 154(b) by 0 days.

(21) Appl. No.: 09/421,014

(22) Filed: Oct. 20, 1999

(30) Foreign Application Priority Data

Oct. 21, 1998 (JP) .................................. 10-299510

(51) Int. Cl.⁷ .................................................. F16F 15/03
(52) U.S. Cl. .......................... 188/267; 267/182; 267/136; 188/378; 248/638
(58) Field of Search ............................ 188/267; 248/562, 248/588, 585, 638, 591, 576, 636; 267/182, 136, 378

(56) References Cited

U.S. PATENT DOCUMENTS

| | | |
|---|---|---|
| 3,840,265 | 10/1974 | Stirling et al. . |
| 4,447,041 * | 5/1984 | Fujita ..................... 254/9 R |
| 4,596,373 * | 6/1986 | Omi et al. ............... 248/562 |
| 6,035,980 * | 3/2000 | Fujita et al. ............. 188/267 |

FOREIGN PATENT DOCUMENTS

| | | | |
|---|---|---|---|
| 4115639A1 | 11/1992 | (DE) . | |
| 56882 * | 1/1981 | (JP) ........................ 188/267 |
| 847510 * | 2/1996 | (JP) ........................ 188/267 |
| 8140780 * | 6/1996 | (JP) ........................ 188/267 |
| 10220525 * | 8/1998 | (JP) ........................ 188/267 |
| 1189206 * | 3/1999 | (JP) ........................ 188/267 |

OTHER PUBLICATIONS

Patent Abstracts of Japan, vol. 1996, No. 10, Oct. 31, 1996 & JP 08140780A (Delta Kogya Co Ltd), Jun. 4, 1996.

* cited by examiner

Primary Examiner—Robert J. Oberleitner
Assistant Examiner—Devon Kramer
(74) Attorney, Agent, or Firm—Wenderoth, Lind & Ponack, L.L.P.

(57) ABSTRACT

A vibration isolator is mounted on a floor of an ambulance and includes a lower frame movably mounted on the floor and an upper frame vertically movably mounted on the lower frame via a link mechanism. The vibration isolator also includes a plurality of magnetic springs interposed between the upper and lower frames and each having a plurality of permanent magnets with like magnetic poles opposed to each other. A vertical vibration of the upper frame is restrained by the plurality of magnetic springs, and the front side of the vibration isolator is lifted upon receipt of a forward acceleration.

6 Claims, 11 Drawing Sheets

VIBRATION ISOLATOR HAVING MAGNETIC SPRINGS

BACKGROUND OF THE INVENTION

1. Field of the Invention

The present invention relates to a vibration isolator for use in, for example, an ambulance for carrying sick or wounded people to make them more comfortable.

2. Description of the Related Art

Hydraulic or air suspensions are employed in most of the vibration isolators, and various measures have been taken up to this time to improve the riding comfort. Vibration isolators that perform an active control to improve the riding comfort have been proposed.

The running of ambulances includes ordinary running, in which they run with the stream of cars, and special running when they are called in an emergency. The riding comfort differs between the ordinary running and the special running.

In order to confirm the effects of the vibration isolators on the riding comfort, actual running tests were carried out using a typical domestic car and a typical imported car. During the tests, longitudinal (back and forth), widthwise (right and left) and vertical accelerations of a floor of an ambulance and those of the waist of a subject lying on a stretcher were measured and analyzed. The tests revealed that the conventional vibration isolators could achieve effective isolation in a high-frequency region (10–20 Hz), but could not satisfactorily restrain low-frequency vibrations (0.1–10 Hz), particularly the longitudinal and vertical low-frequency vibrations. For this reason, there arose the problems that the condition of a sick or wounded person may become worse due to resonance of his or her internal organs in particular, a fluctuation in blood pressure (a sense in which blood concentrates on the head) may be caused by a nose dive, or he or she may get carsick. Such problems were, however, sometimes caused by an improper adjustment of a suspension system of the vibration isolator to the vehicle body.

SUMMARY OF THE INVENTION

The present invention has been developed to overcome the above-described disadvantages.

It is accordingly an objective of the present invention to provide a vibration isolator for use in an ambulance that can restrain unpleasant feeling of a sick or wounded person, which has been hitherto caused by a sudden stop or rapid speed reduction, by making use of magnetic springs and magnetic dampers in a suspension mechanism of the vibration isolator.

In accomplishing the above and other objectives, the vibration isolator according to the present invention includes a lower frame movably mounted on a floor, an upper frame vertically movably mounted on the lower frame, a link mechanism coupled to the upper and lower frames, operable to move the upper frame relative to the lower frame, and a plurality of magnetic springs interposed between the upper and lower frames and each having a plurality of permanent magnets with like magnetic poles opposed to each other. In this vibration isolator, a vertical vibration of the upper frame relative to the lower frame is restrained by the plurality of magnetic springs, and the front side of the vibration isolator is lifted upon receipt of a forward acceleration.

Furthermore, an acceleration inputted in a direction longitudinally of the vibration isolator is restrained by virtue of a single-sided pendulum motion about an instantaneous center of rotation of the lower frame.

BRIEF DESCRIPTION OF THE DRAWINGS

The above and other objectives and features of the present invention will become more apparent from the following description of preferred embodiments thereof with reference to the accompanying drawings, throughout which like parts are designated by like reference numerals, and wherein.

DETAILED DESCRIPTION OF THE PREFERRED EMBODIMENTS

This application is based on an application No. 10-299510 filed Oct. 21, 1998 in Japan, the content of which is incorporated hereinto by reference.

Figure 1:
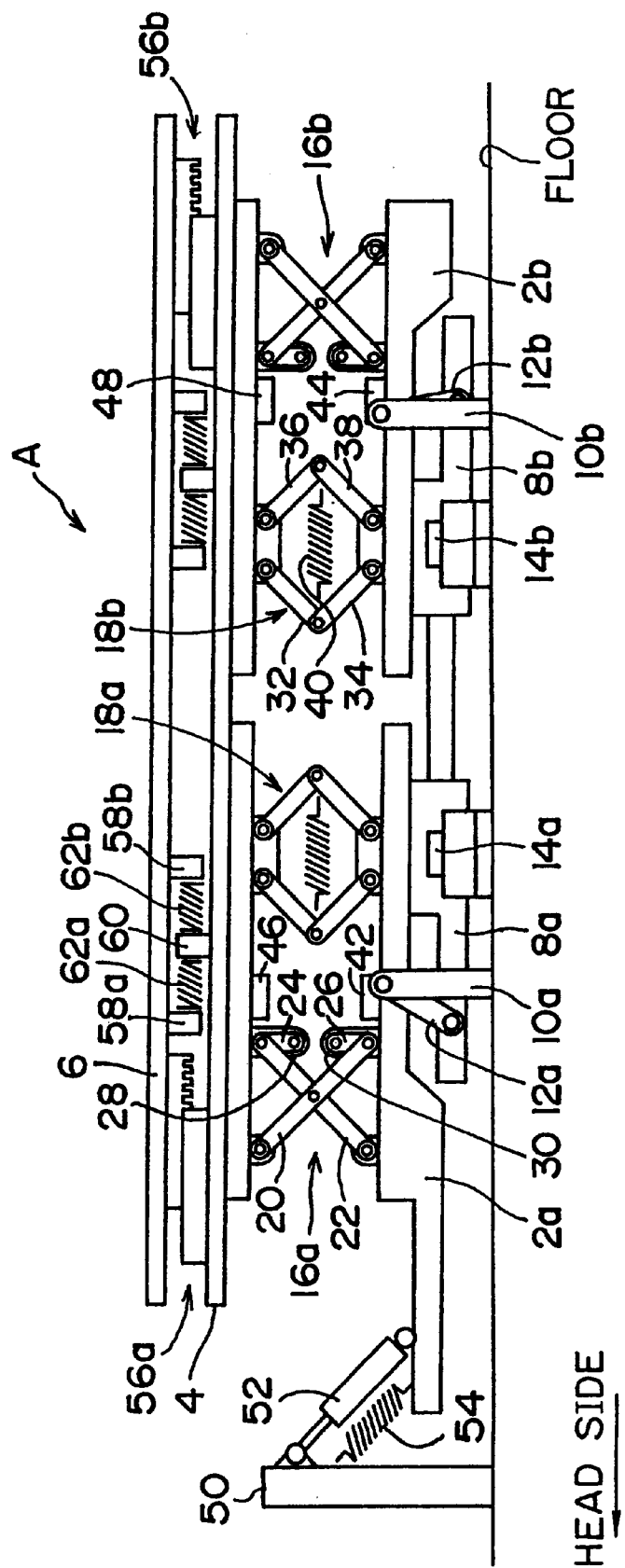
FIG. 1 is a schematic side view of a vibration isolator according to a first embodiment of the present invention.

Referring now to the drawings, there is shown in FIG. 1 a vibration isolator A according to a first embodiment of the present invention. The vibration isolator A includes two lower frames 2a, 2b secured to each other and mounted on a floor so as to be movable in the longitudinal direction thereof, an upper frame 4 vertically movably mounted on the lower frames 2a, 2b, and a top plate 6 longitudinally slidably mounted on the upper frame 4. The two lower frames 2a, 2b are sometimes referred to simply as a lower frame 2 hereinafter.

Each of the lower frames 2a, 2b is provided with a conductor 8a, 8b such as, for example, aluminum secured to the lower surface thereof. The conductor 8a (8b) is mounted, via levers 12a (12b) disposed on respective sides thereof, on support plates 10a (10b) extending upwardly from the floor so as to be movable in the longitudinal direction of the vibration isolator A. Two permanent magnets 14a (or 14b), which are spaced a predetermined distance from each other, are securely mounted on the floor on respective sides of each conductor 8a (or 8b).

The upper frame 4 is coupled to the lower frame 2 via X-shaped, links 16a, 16b and pantographs 18a, 18b, both disposed on respective sides thereof.

Each of the X-shaped links 16a, 16b includes two relatively long levers 20,22, each of which is pivotally connected at one end thereof to the upper frame 4 or the lower frame 2. The other end of the lever 20 is pivotally connected to one end of relatively short lever 26, the other end of which is pivotally connected to an upper nd of a support member 30 extending upwardly from the lower frame 2. Similarly, the other end of the lever 22 is pivotally connected to one end of a relatively short lever 24, the other end of which is pivotally connected to a lower end of a support member 28 extending downwardly from the upper frame 4. The two relatively long levers 20, 22 are mutually pivotally connected at intermediate portions thereof.

Each of the pantographs 18a, 18b includes four levers 32, 34, 36, 38. Of these levers 32, 34, 36, 38, the two levers 32, 34 are pivotally connected to each other in the form of "L", while the other two levers 36, 38 are similarly pivotally connected to each other in a symmetric fashion relative to the two levers 32,34. The levers 32,36 are pivotally connected at upper ends thereof to the upper frame 4, while the levers 34, 38 are pivotally connected at lower ends thereof to the lower frame 2. Furthermore, a coil spring 40 is connected at one end thereof to a connecting portion between the two levers 32, 34 and the other end thereof to a connecting portion between the other two levers 36, 38, thereby generating a lifting force of the upper frame 4.

Each of the lower frames 2a, 2b is provided with a permanent magnet 42, 44 secured to the upper surface thereof at a center in the widthwise direction thereof. The permanent magnets 42, 44 confront permanent magnets 46, 48 secured to the lower surface of the upper frame 4, respectively, with like magnetic poles opposed to each other. A repulsive force acting between the two permanent magnets 42,46 and that acting between the two permanent magnets 44, 48 act as lifting forces of the upper frame 4. The lower frame 2 is connected, via a shock absorber 52 and a coil spring 54, to a support member 50 secured to the floor on the left-hand side as viewed in FIG. 1 (this side is hereinafter referred to as the head side of a sick or wounded person, while the opposite side is hereinafter referred to as the leg side).

The top plate 6 is mounted on the upper frame 4 via sliders 56a, 56b disposed on respective sides thereof so as to be slidable in the longitudinal direction of the vibration isolator A. On each of the head and leg sides, the top plate 6 is provided with two projections 58a, 58b secured to the lower surface thereof, while the upper frame 4 is provided with a projection 60 secured to the upper surface thereof and interposed between the two projections 58a, 58b of the top plate 6. Coil springs 62a, 62b and rubber dampers (not shown) are interposed between the projection 58a of the top plate 6 and the projection 60 of the upper frame 4 and between the projection 58b of the top plate 6 and the projection 60 of the upper frame 4, respectively, thereby maintaining the top plate 6 at a predetermined position relative to the upper frame 4.

In the above-described construction, of the component parts mounted on the upper and lower frames 4,2 and those on the top plate 6, the permanent magnets 42, 44, 46, 48, the shock absorber 52, the coil spring 54 and the like are disposed at the central portion of the vibration isolator A in the widthwise direction thereof while the other component parts are disposed on respective sides of the vibration isolator A, but only one side is shown in FIG. 1.

The vibration isolator A of the above-described construction operates as follows.

Figure 2:
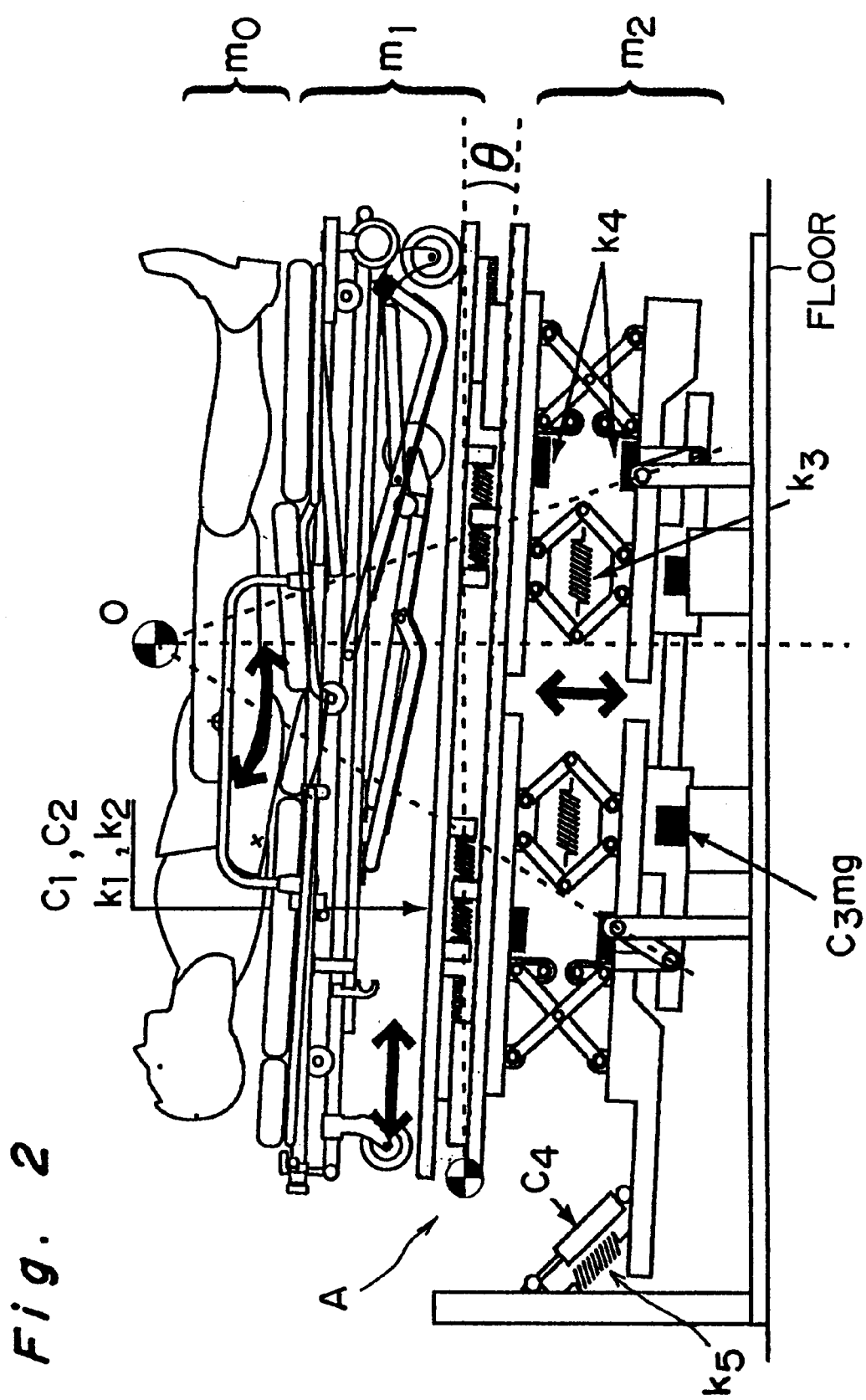
FIG. 2 is a schematic side view of the vibration isolator of FIG. 1 on which a stretcher together with a sick or wounded person is placed, particularly showing the behavior of various portions of the vibration isolator.

As shown in FIG. 2, various physical values associated with the vibration isolator A are represented as follows.

$m_0$: mass of a sick or wounded person;

$m_1$: mass of a stretcher;

$m_2$: mass of the vibration isolator A;

$k_1$: spring constant of the coil spring 62a interposed between the projections 58a, 60;

$k_2$: spring constant of the coil spring 62b interposed between the projections 58b, 60;

$k_3$: spring constant of the coil spring 40 mounted in the pantographs 18a, 18b;

$k_4$: spring constant of the magnetic spring made up of the two permanent magnets 42, 46 or 44, 48;

$k_5$: spring constant of the coil spring 54 having one end secured to the lower frame 2a;

$C_1$: damping coefficient of the rubber damper interposed between the projections 58a, 60;

$C_2$: damping coefficient of the rubber damper interposed between the projections 58b, 60;

$C_{3mg}$: damping coefficient of the magnetic damper made up of the permanent magnets 14a (14b) and the conductor 8a (8b);

$C_4$: damping coefficient of the shock absorber 52 having one end secured to the lower frame 2a.

Figure 3:
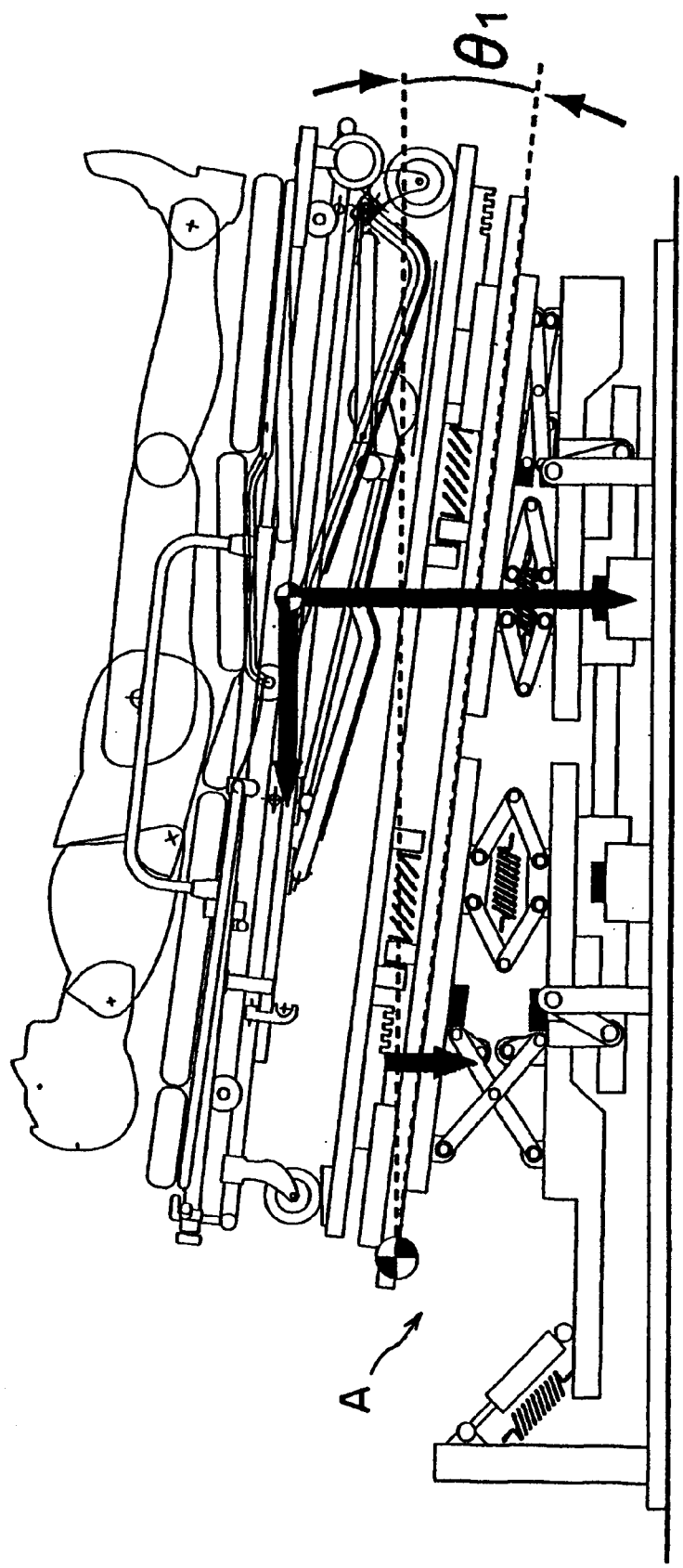
FIG. 3 is a schematic side view of the vibration isolator of FIG. 2, particularly showing the case where an acceleration has been applied thereto by sudden braking.
Figure 4:
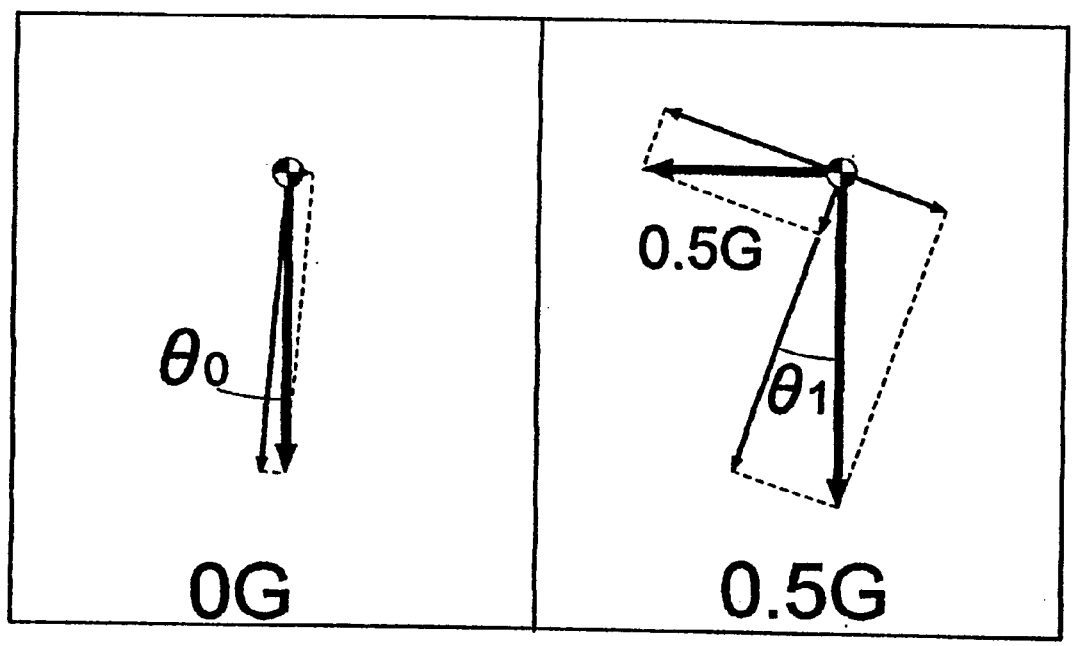
FIG. 4 is a schematic diagram showing relationships between a component of the acceleration in the direction of advance of the vibration isolator and a component of the acceleration of gravity in the direction of advance of the vibration isolator during ordinary running and during sudden braking.

The vibration isolator A according to the present invention includes means for restraining pitching vibration of a living body, which may be caused by sudden braking or when running over a projection, or an acceleration created in the longitudinal direction. More specifically, the vibration isolating mechanism makes use of, as such means, two motions: a pseudo-single-sided pendulum motion about an instantaneous center of rotation of the lower frames 2a, 2b relative to the floor as means for restraining the motion of the head in the upward direction only, and a translation motion of the masses ($m_0+m_1$) occurring in the same direction as the travel of the vehicle. In conventional active control systems, an acceleration of about 0.5 G that is created in the event of sudden braking is reduced by making use of the acceleration of gravity. According to the present invention, however, as shown in FIG. 3, a reaction against the acceleration caused by the sudden braking is utilized to move the center of the masses ($m_0+m_1$) rearwards (toward the leg side), thereby activating the metal spring ($k_3$) and the magnetic spring ($k_4$) on the rear side. As a result, the angle θ of inclination of the top plate 6 becomes large. At this moment, as shown in FIG. 4, a component, directed in the direction of advance of the vibration isolator A, of the acceleration caused by the sudden braking is reduced by a component of the acceleration of gravity in the direction of advance of the vibration isolator A. The remainder is attenuated by the metal springs ($k_1$, $k_2$), the rubber dampers ($C_1$, $C_2$), and the magnetic dampers ($C_3$).

Further explanation is made hereinafter in detail.

Figure 5:
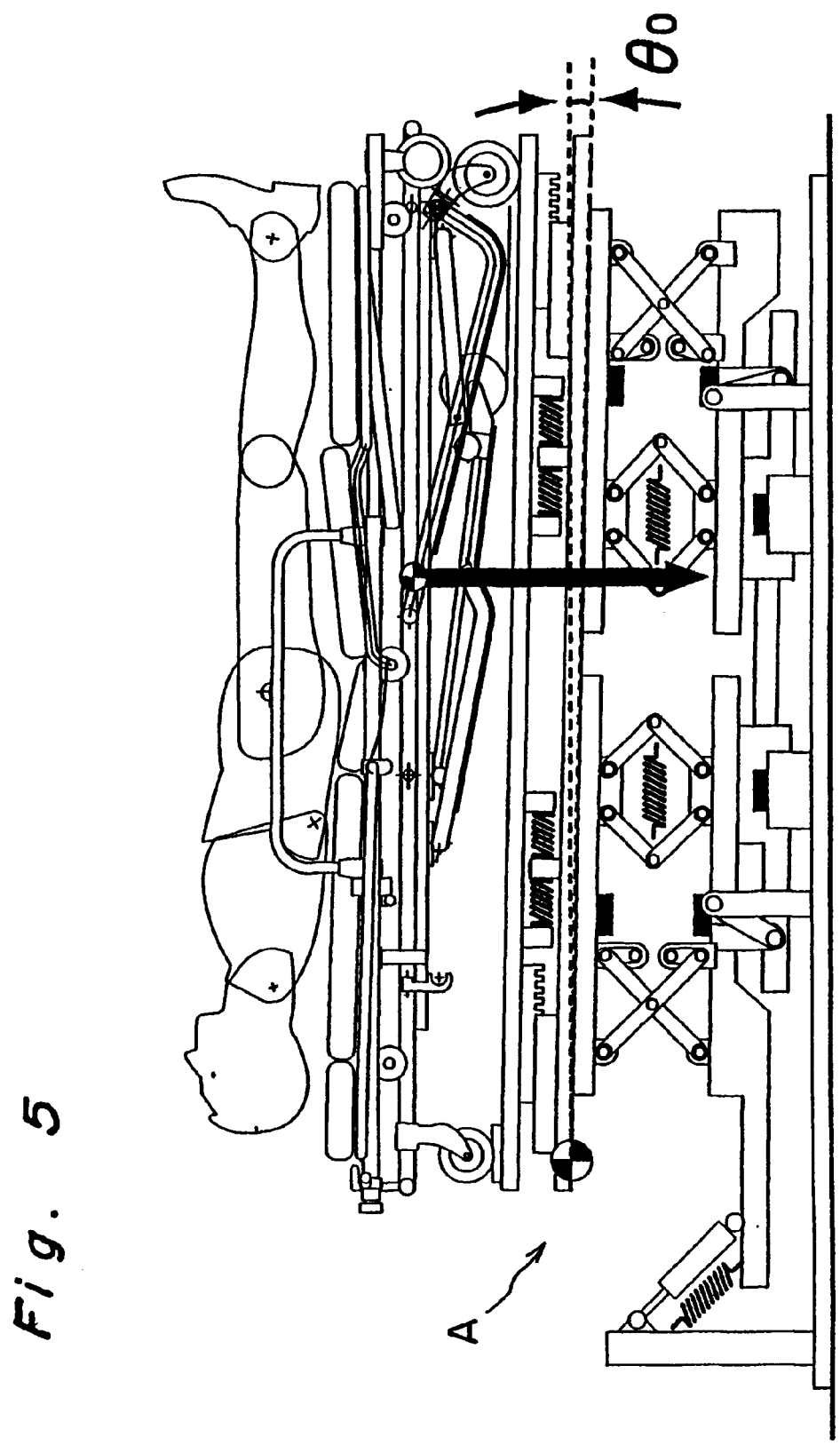
FIG. 5 is a schematic; side view of the vibration isolator of FIG. 2, particularly showing the initial angle of inclination thereof.

FIG. 5 depicts an initial condition of the vibration isolator A on which a sick or wounded person together with a stretcher is placed. In this condition, the upper frame 4 is maintained at an initial angle $\theta_0$ of inclination by the metal spring 54 and the shock absorber 52. At this moment, if an acceleration of, for example, about 0.5 G is inputted to the vibration isolator A by sudden braking, it moves towards the head side against the biasing forces of the coil springs 62a with a point O shown in FIG. 2 as an instantaneous center of rotation. The center of gravity of the masses $(m_0+m_1)$ is then moved rearwards by a reaction against the acceleration, i.e., the biasing forces of the coil springs 62a, and a large load is applied to the pantograph 18b and the magnetic spring 44, 48 on the leg side, thereby increasing the angle $\theta$ of inclination of the upper frame 4, as shown in FIG. 3. When the angle $\theta$ of inclination increases, a forward component of the acceleration caused by the sudden braking is attenuated by a rearward component of the acceleration of gravity, as shown in FIG. 4, while the remaining component that has not been attenuated by the rearward component of the acceleration of gravity is attenuated by the spring forces of the coil springs 62a, 62b, the damping forces of the rubber dampers, and the damping forces caused by electromagnetic induction between the permanent magnets 14a, 14b and the conductors 8a, 8b.

Figure 6:
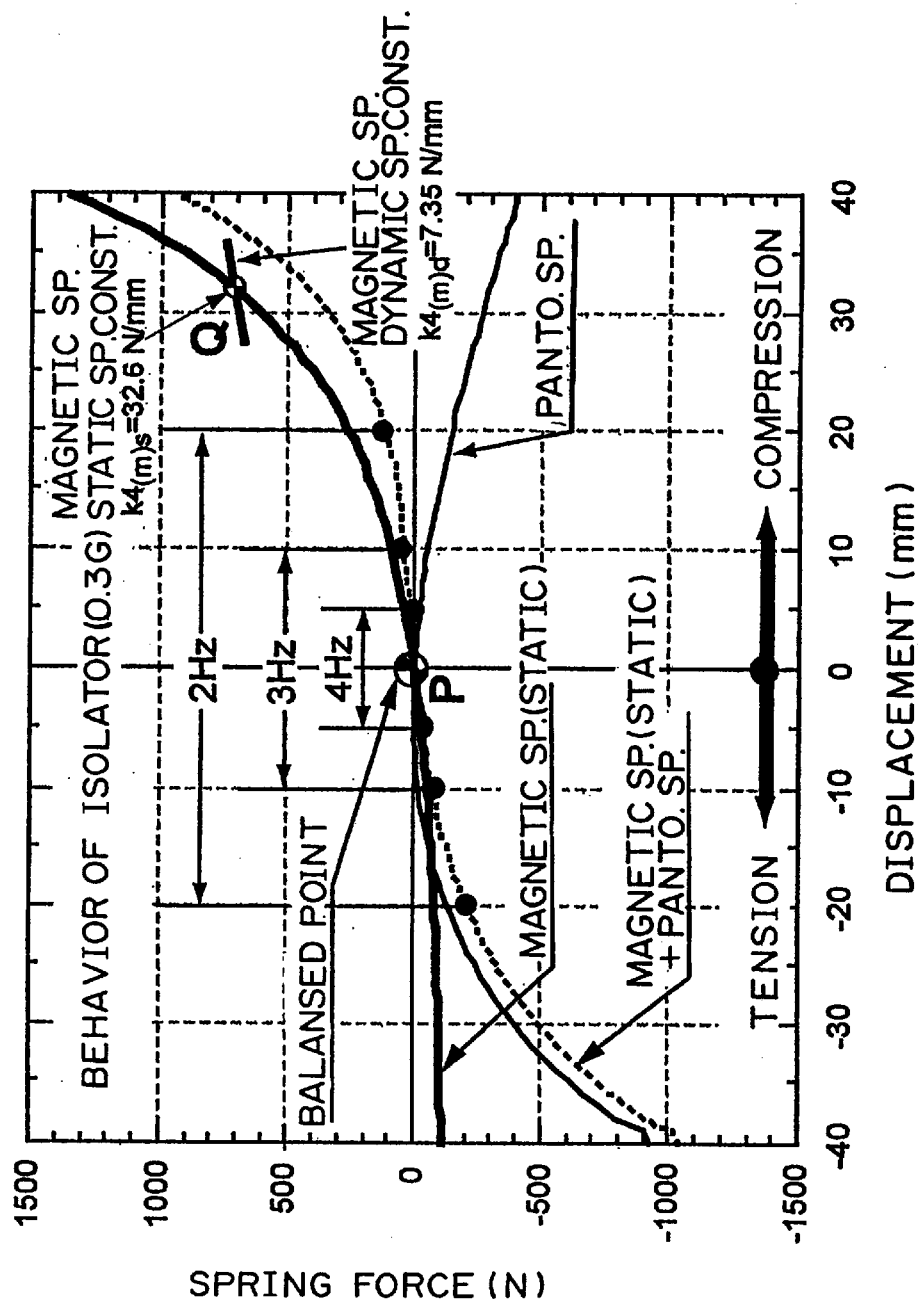
FIG. 6 is a graph showing a relationship between the displacement and spring forces of various springs mounted in the vibration isolator of FIG. 1.

Furthermore, the vibration characteristics of the magnetic springs are utilized as means for restraining vertical vibration. FIG. 6 depicts the spring characteristics of the vibration isolating mechanism in response to the vertical vibration and the response amplitude at several frequencies when the vibration isolating mechanism has been oscillated by a sine wave having an acceleration amplitude of 0.3 G. The relationship between the magnetic spring force and the displacement has been found from formulas (3) and (4), and the relationship between the metal spring force and the displacement has been found in view of the conversion of force by the link structure. The results fall within 5% variations with respect to actual measurements.

Figure 7:
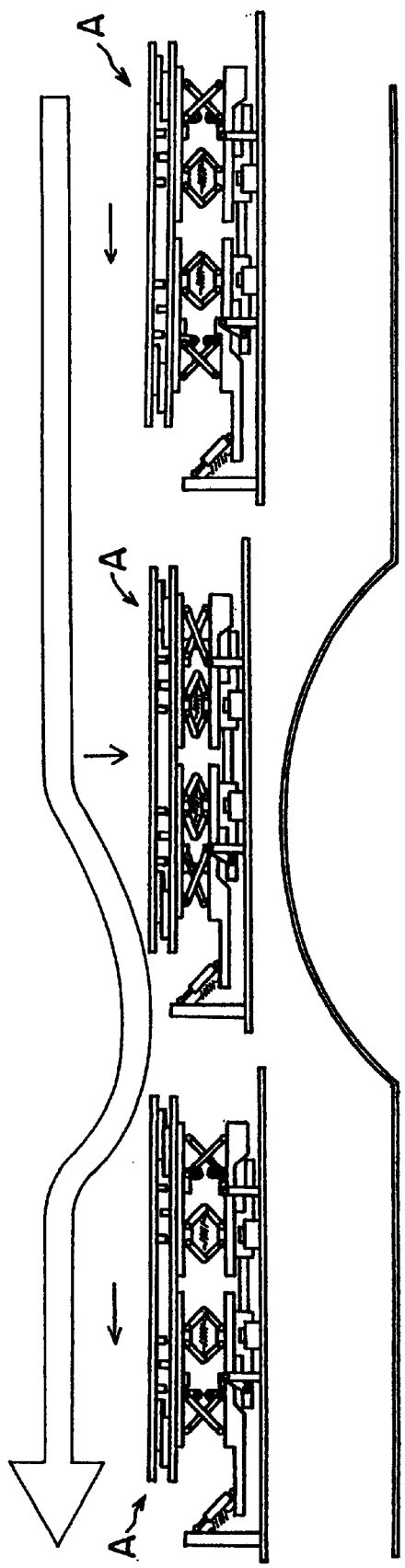
FIG. 7 is a side view of the vibration isolator of FIG. 1, particularly showing the behavior of an upper frame when the vibration isolator rides over a projection.

As shown in FIGS. 6 and 7, when the pantograph that has been designed at a balanced position P in advance is compressed by an impact from the floor that may be caused by a projection on the floor, the pantograph is further compressed by virtue of the negative damping characteristics thereof, and the top plate on the springs is depressed in the direction of gravity. When the speed has approached zero at a bottom dead point (this corresponds to the time when the vibration isolator has reached a position close to the top of the projection), an upward push-back is commenced by virtue of the positive damping characteristics of a combined spring of the static magnetic springs and the metal springs.

On the other hand, under the condition in which the top plate 6 is oscillating, the dynamic magnetic springs provide positive spring characteristics, for example, at point Q in FIG. 6, while the pantographs provide negative spring characteristics. The combined characteristics of the pantographs and the dynamic magnetic springs exhibit a pseudo-condition of k=0 and eliminate the resonant point, making it possible to reduce the vibration transmissibility.

More specifically, the frequency of a pendulum is given by:

$$f = \frac{1}{2\pi}\sqrt{\frac{g}{l}} \qquad (1)$$

The natural frequency of the metal spring ($k_5$) is set to a value higher than f. Both the shock absorber ($C_4$) and the magnetic dampers ($C_3$) provide damping characteristics. The damping coefficient of the magnetic dampers is approximately given by:

$$C_{3mg} = pB^2hA\alpha/\sigma \qquad (2)$$

p: number of magnetic fluxes
B: magnetic flux density
h: thickness of a conductor
A: area of magnetic fluxes
α: experimental correction factor
ρ: electrical resistance of the conductor.

Furthermore, the force by the magnetic spring is given by:

$$F = \frac{k_{(m)}}{z} + F_0 \qquad (3)$$

Accordingly, any optimum spring constant can be set by selecting the distance (z) between the magnets at the balanced position with the loaded mass, $k_m$ and $F_0$ being constants. By way of example, the force produced by the magnetic spring in the vicinity of the balanced point and in the vicinity of the bottom dead point within a predetermined stroke are respectively given by:

$$F_{r1} = \frac{4.27}{z} + 224, \quad F_{r2} = \frac{7.31}{z} - 24 \qquad (4)$$

The natural frequency of the magnetic spring is given by:

$$f_m = \frac{1}{2\pi}\sqrt{\frac{(mg - F_0)^2}{m \cdot k_{(m)}}} \qquad (5)$$

m: loaded mass.

In FIG. 6, actual measurements of the static spring constant and the dynamic spring constant of the magnetic spring used are indicated.

Longitudinal (back and forth), widthwise (right and left) and vertical accelerations of a floor (the support portion of the vibration isolator) on an axle of rear wheels and those of the waists of subjects lying on a stretcher were measured using a domestic car A having a relatively hard suspension and an imported car B having a relatively soft suspension. The weights of the subjects were 56 kg, 72 kg, and 82 kg.

Also, acceleration measurements and sensory evaluation were carried out using the car A having a floor of a large acceleration, the car B and a trial car C capable of reproducing the same acceleration as in the car A. All the cars A, B and C were caused to run on a paved road with the vibration isolator A according to the present invention mounted in the car C.

Figure 8:
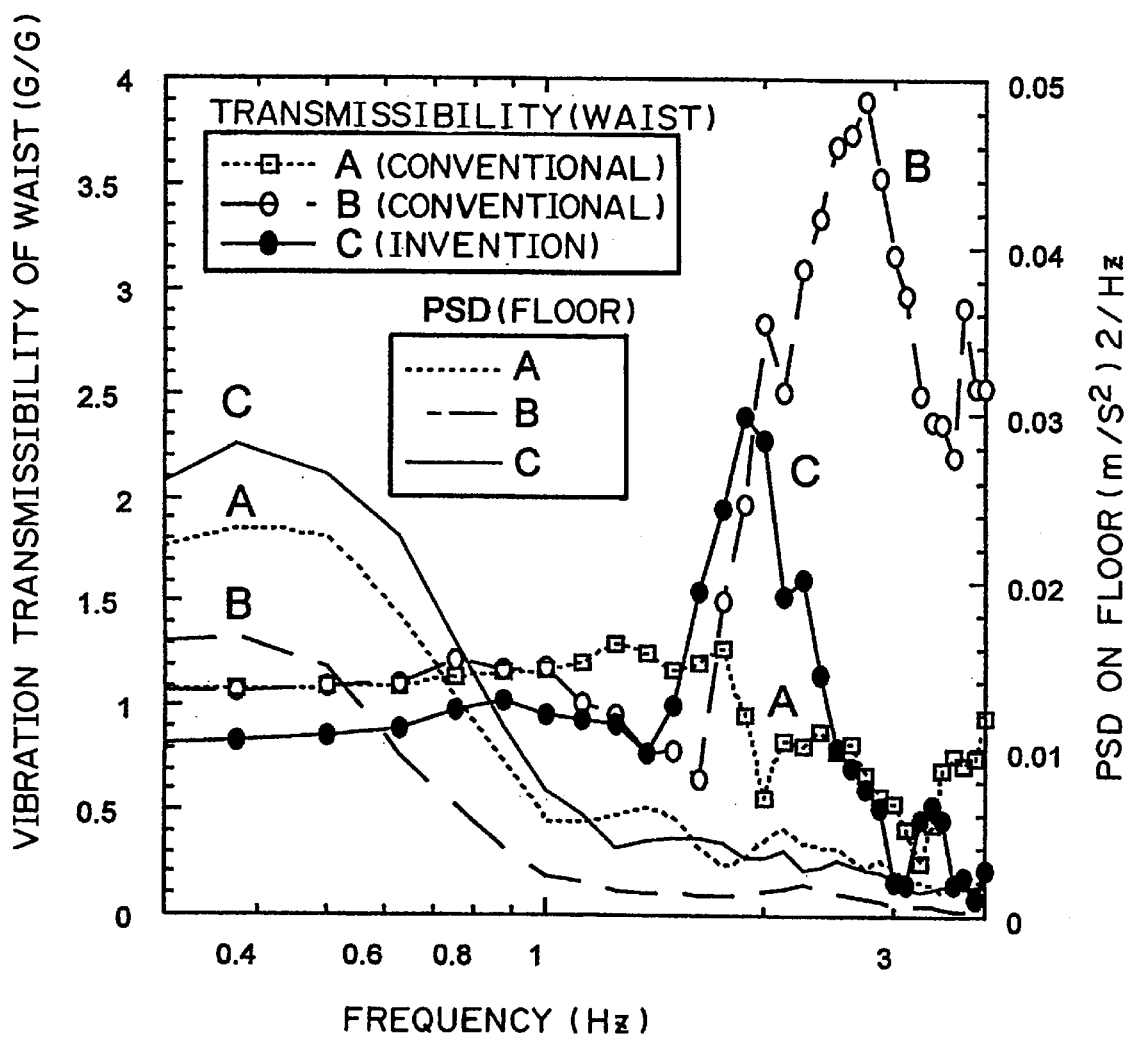
FIG. 8 is a graph showing the PSD (Power Spectral Density) of the acceleration on a floor and the vibration transmissibility of the waist of a subject on the stretcher with respect to a longitudinal vibration during actual running.
Figure 9:
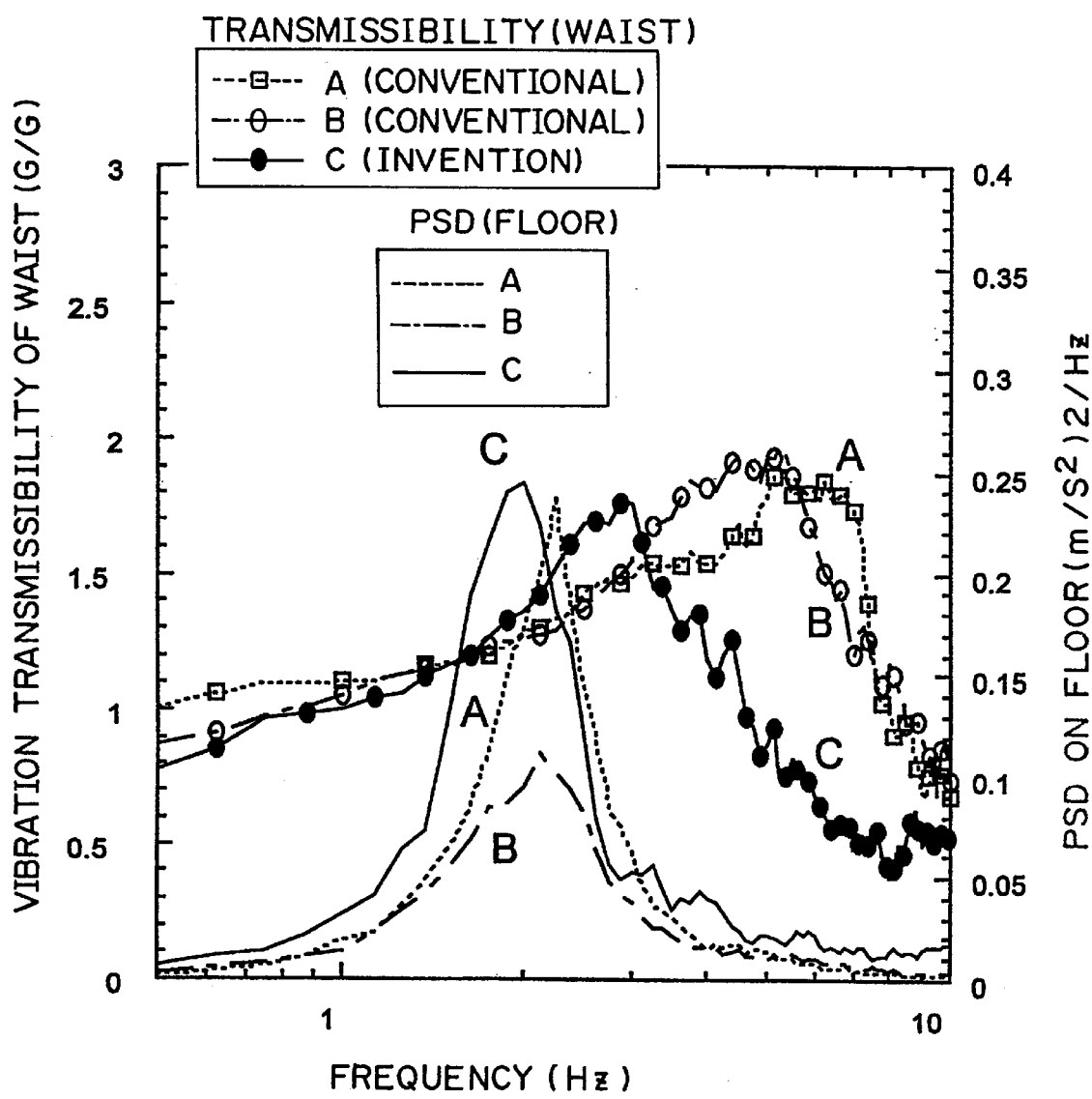
FIG. 9 is a graph similar to FIG. 8, but showing the PSD of the acceleration on the floor and the vibration transmissibility of the waist of the subject on the stretcher with respect to a vertical vibration during actual running.

FIGS. 8 and 9 depict the PSD (Power Spectral Density) of the acceleration on the floor and the vibration transmissibility of the waist of the subject on the stretcher with respect to the longitudinal and vertical vibrations during actual running, respectively. As shown therein, the magnetic spring type vibration isolator A has a resonant frequency of about 2 Hz with respect to the longitudinal vibration and a resonant frequency of about 3 Hz with respect to the vertical vibration. These 10 resonant frequencies deviate from the resonant frequencies of 0.4 Hz and 2 Hz of the floor, respectively.

The graph of FIG. 8 reveals that the performance has been improved at low-frequency regions of about 0.3–1 Hz and about 3 Hz, and it is unlikely that resonance occurs on the head or legs having a resonant point in the range of 0.6–4 Hz.

The n-th order natural frequency of a wheel base with respect to the vertical vibration is given by:

$$f_{WB} = n \times \frac{V}{L} \qquad (6)$$

V: vehicle speed
L: length of wheel base
n: order of road-surface shape component.

As can be seen from the graph of FIG. 9, the car C has been improved as compared with the cars A and B in that the resonance of internal organs has been relieved at frequencies of 4–8 Hz that correspond to a vehicle speed range of up to 80 km/h.

When the vibration energy ratio of the waist of the human body to the floor was evaluated by making use of the SEAT value (Seat Effective Amplitude Transmissibility) that was proposed by Mr. Griffin, the conventional articles exhibited 145–155. On the other hand, the article according to the present invention exhibited 135, which indicates that the vibration energy has been reduced by about 10%.

Furthermore, the sensory evaluation that was carried out using a trial car was as follows.

(1) The tendency of the head to fall down during sudden braking has been fairly reduced.
(2) The vibration of the vehicle body has not been transmitted to the stretcher.
(3) Upon receipt of an impact, the legs have not been caused to spring up as if they have got stuck to the floor.
(4) The performance has been improved, compared with the conventional articles.
(5) The rolling properties have been improved.

Figure 10:
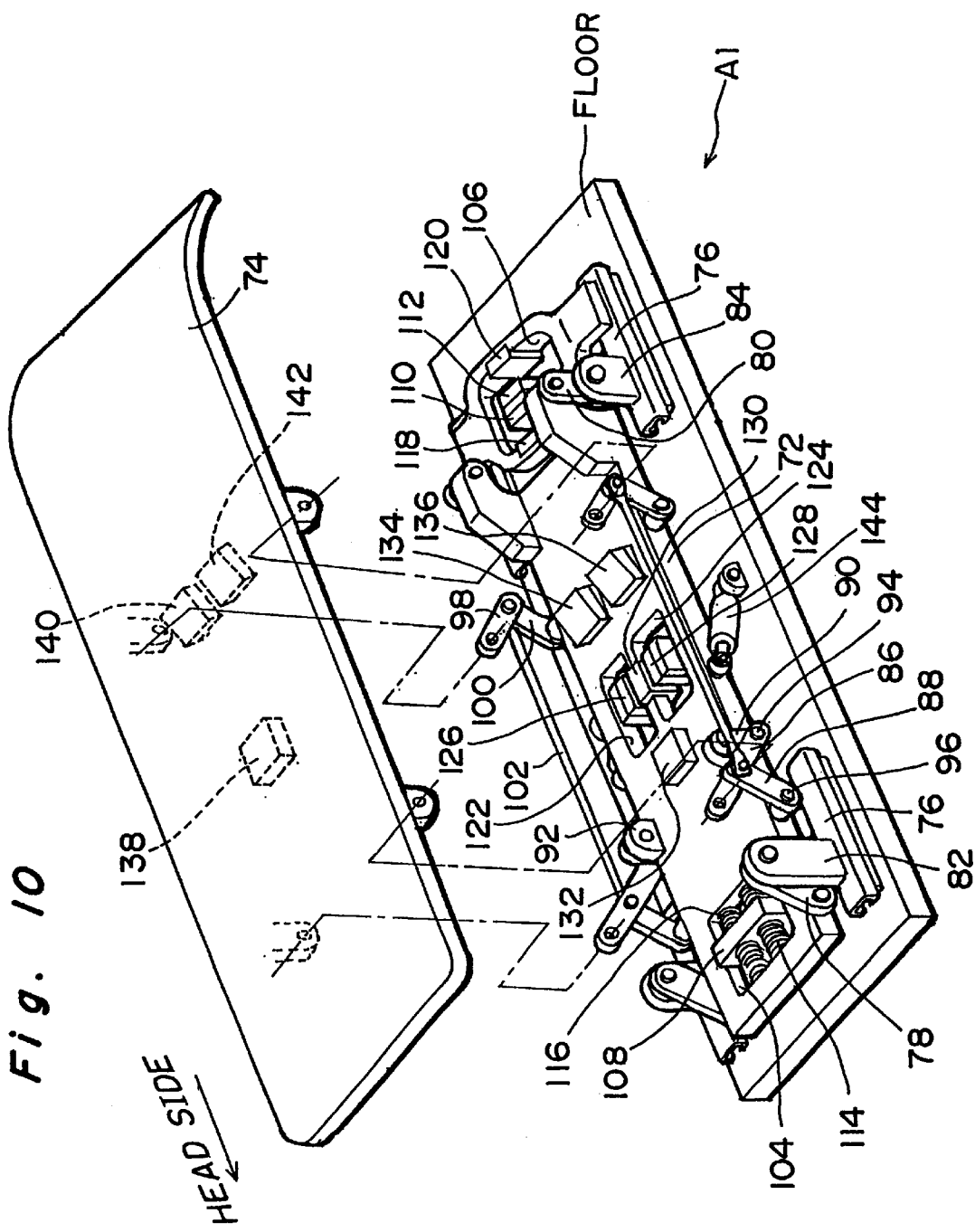
FIG. 10 is an exploded perspective view of a vibration isolator according to a second embodiment of the present invention.

FIG. 10 depicts a vibration isolator A1 according to a second embodiment of the present invention, which includes a lower frame 72 longitudinally movably mounted on the floor and an upper frame 74 vertically movably mounted on the lower frame 72.

The lower frame 72 is mounted on the floor via a plurality of sliders 76 disposed at front and rear portions thereof so as to be slidable in the longitudinal direction of the vibration isolator A1. The lower frame 72 is coupled to the sliders 76 via a plurality of levers 78, 80 to allow a rocking motion thereof. Each of the levers 78 has a lower end pivotally mounted on the lower frame 72 and an upper end pivotally mounted on an upper end of a support plate 82 extending upwardly from the front slider 76. Each of the levers 80 has an upper end pivotally mounted on the lower frame 72 and a lower end pivotally mounted on an upper end of a support plate 84 extending upwardly from the rear slider 76.

Also, the upper frame 74 is coupled to the lower frame 72 via a plurality of y-shaped links and v-shaped links, both disposed on respective sides of the lower frame 72.

Each of the y-shaped links is made up of a relatively long lever 86 and a relatively short lever 88. The long lever 86 has an upper end pivotally mounted on the upper frame 74 and a lower end pivotally mounted on a lower end of another lever 90, an upper end of which is pivotally mounted on a bracket 92 secured to the upper surface of the lower frame 72. On the other hand, the short lever 88 has an upper end pivotally mounted on an intermediate portion of the long lever 86 and a lower end pivotally mounted on the lower frame 72. The lower ends of the two long levers 86 and those of the two short levers 88 are connected to each other via rods 94, 96, respectively. A plurality of coil springs (not shown) are connected at opposite ends thereof to the rods 94, 96, respectively, to generate a lifting force of the upper frame 74.

Each of the v-shaped links is made up of two levers 98, 100 pivotally connected to each other. An upper end of the upper lever 98 is pivotally connected to the upper frame 74, while a lower end of the lower lever 100 is pivotally connected to the lower frame 72. The connecting portion of the two levers 98, 100 is connected, via a rod 102, to the connecting portion of the long and short levers 86, 88 constituting the y-shaped link, thereby interlocking the y-shaped links and the associated v-shaped links with each other to vertically move the upper frame 74.

The lower frame 72 has generally rectangular openings 104, 106 defined therein at front (head-side) and rear (leg-side) portions thereof, through which a projection 108 and permanent magnets 110, 112 secured to the floor extend, respectively. A plurality of coil springs 114, 116 are disposed in front of and behind the projection 108, while two permanent magnets 118, 120 are disposed in front of and behind the two permanent magnets 110,112. The two permanent magnets 118, 120 are secured to the lower frame 72 and spaced from the permanent magnets 110, 112, respectively, with like (repulsive) magnetic poles opposed to each other, making it possible to attenuate a longitudinal movement of the lower frame 72.

The lower frame 72 also has two generally rectangular openings 122, 124 defined therein in a side-by-side fashion at an intermediate portion thereof, through which permanent magnets 126, 128 secured to the floor extend, respectively. A conductor 130 made of, for example, aluminum and secured to the lower frame 72 is interposed between the two permanent magnets 126, 128 so that the longitudinal movement of the lower frame 72 may be attenuated by virtue of electromagnetic induction.

Moreover, a permanent magnet 132 and two permanent magnets 134, 136 are secured to the lower frame 72 at locations in front of and behind the conductor 130, respectively. The three permanent magnets 132, 134, 136 confront permanent magnets 138, 140, 142 secured to the upper frame 74 and are spaced a predetermined distance therefrom, respectively, with like magnetic poles opposed to each other. The two opposing permanent magnets constitute a magnetic spring to attenuate a vertical movement of the upper frame 74. As shown in FIG. 10, the two permanent magnets 134, 136 are inclined with respect to the lower frame 72, while the two permanent magnets 140, 142 are similarly inclined with respect to the upper frame 74.

Two shock absorbers 144 each having an upper end pivotally connected to the lower frame 72 and a lower end pivotally connected to the floor are disposed on respective sides of the lower frame 72 generally at the center thereof.

It is to be noted here that in the vibration isolator A1 as shown in FIG. 10, a stretcher together with a sick or wounded person is to be placed on the upper frame 74.

The operation of the vibration isolator A1 of the above-described construction is explained hereinafter with reference to FIGS. 11A, 11B, 12A and 12B.

Figure 11A:
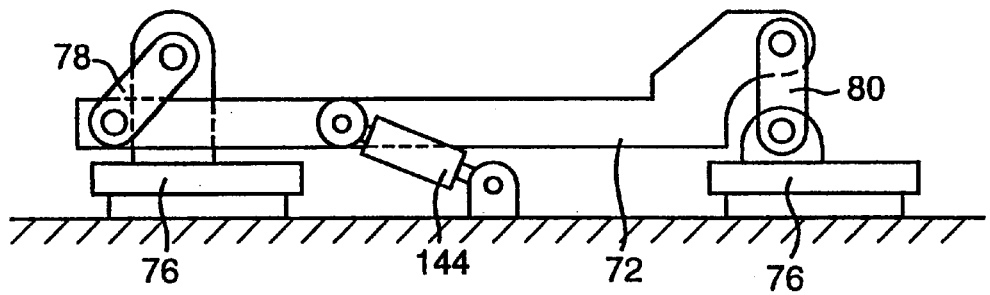
FIG. 11A is a schematic side view of a lower frame of the vibration isolator of FIG. 10 during ordinary running.
Figure 11B:
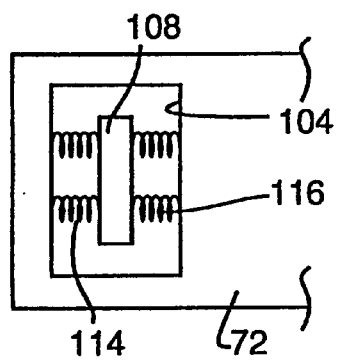
FIG. 11 B is a fragmentary schematic plan view of a portion of the lower frame of FIG. 11A.
Figure 12A:
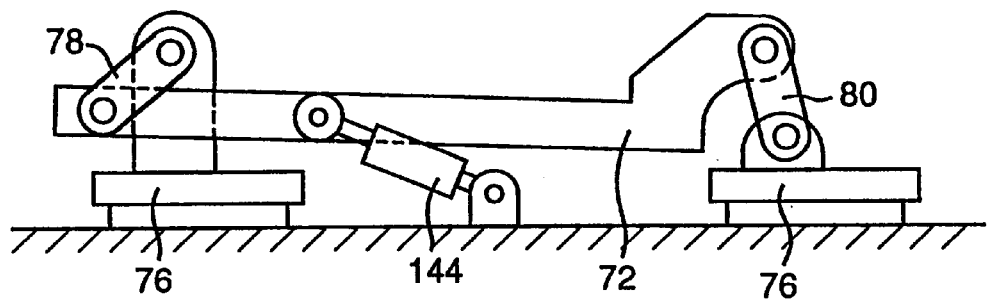
FIG. 12A is a view similar to FIG. 11A, but during sudden braking.
Figure 12B:
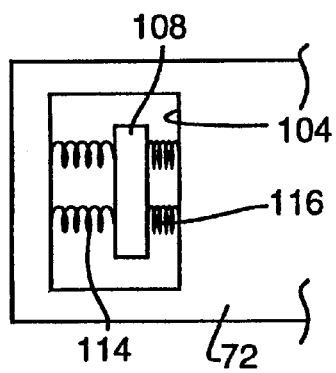
FIG. 12B is a view similar to FIG. 11B, but during sudden braking.

Under the condition in which a stretcher together with a sick or wounded person is placed on the vibration isolator A1, the lower frame 72 is held at a predetermined position by the coil springs 114, 116, the permanent magnets 110, 112, 118, 120, the shock absorbers 144 and the like, as shown in FIG. 11A. At this moment, when an acceleration is inputted by, for example, sudden braking, the lower frame 72 is caused to rock to the head (front) side about the instantaneous center of rotation thereof against the biasing force of the coil springs 116 and the repulsive force of the permanent magnets 110, 118.

Because the front lever 78 is pivotally connected at the upper end thereof to the slider 76 and at the lower end thereof to the lower frame 72, while the rear lever 80 is contrariwise pivotally connected at the upper end thereof to the lower frame 72 and at the lower end thereof to the slider 76, the head side of the lower frame 72 is lifted, whereas the leg side of the lower frame 72 is caused to drop. As a result, a frontward component of the acceleration caused by the sudden braking is attenuated by a rearward component of the acceleration of gravity, while the remaining component that cannot be attenuated by the rearward component of the acceleration of gravity is attenuated by the spring forces of the coil springs 114, 116, the repulsive force of the permanent magnets 110, 118, and the damping force created by electromagnetic induction acting between the permanent magnets 126, 128 and the conductor 130.

It is to be noted that the vibration isolator A1 shown in FIG. 10 does not always require the rods 102 for connecting the y-shaped links and the v-shaped links. In the construction having no such rods, the y-shaped links and the v-shaped links operate independently. In that case, upon receipt of an acceleration caused by sudden braking, the angle of inclination of the upper frame 74 and the rearward component of the acceleration of gravity become larger, making it possible to effectively attenuate the forward component of the acceleration caused by the sudden braking.

As described hereinabove, according to the present invention, the magnetic springs made up of a plurality of permanent magnets with like magnetic poles opposed to each other act to restrain the vertical vibration, and the front side of the vibration isolator is lifted upon receipt of a forward acceleration caused by, for example, a rapid speed reduction. Accordingly, a component of the acceleration in the direction of advance of the vibration isolator is reduced by a component of the acceleration of gravity acting in the direction of advance of the vibration isolator, making it possible to improve the riding comfort of the vibration isolator.

Moreover, an acceleration inputted in the longitudinal direction of the vibration isolator is restrained by virtue of a single-sided pendulum motion about an instantaneous center of rotation of the lower frame. By so doing, the riding comfort can be improved with a simple structure.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A vibration isolator mounted on a floor and having a front side and a rear side opposite to each other, said vibration isolator comprising:
   a lower frame;
   a plurality of levers for movably supporting said lower frame relative to the floor, said plurality of levers defining an instantaneous center of rotation of said lower frame;
   an upper frame vertically movably mounted on said lower frame;
   a link mechanism coupled to said upper and lower frames, operable to move said upper frame relative to said lower frame;
   at least two permanent magnets secured to said upper and lower frames, respectively, with like magnetic poles opposed to each other; and
   a plurality of coil springs for holding said lower frame at a predetermined position;
   wherein a vertical movement of said upper frame relative to said lower frame is restrained by said permanent magnets;
   wherein when a forward acceleration is inputted by sudden braking, said lower frame is moved forwardly by virtue of a single-sided pendulum motion about the instantaneous center of rotation thereof against a biasing force of said coil springs, so that a front side of said lower frame is lifted and a rear side of said lower frame is lowered, thereby restraining the forward acceleration; and
   wherein the forward movement of said lower frame lowers said upper frame relative to said lower frame, thereby restraining the forward acceleration.

2. The vibration isolator of claim 1 wherein said lower frame is movably mounted on the floor.

3. A vibration isolator mounted on a floor and having a front side and a rear side opposite to each other, said vibration isolator comprising:
   a lower frame;
   a plurality of levers for movably supporting said lower frame relative to the floor, said plurality of levers defining an instantaneous center of rotation of said lower frame;
   an upper frame vertically movably mounted on said lower frame;
   a link mechanism coupled to said upper and lower frames operable to move said upper frame relative to said lower frame;
   at least two first permanent magnets secured to said upper and lower frames, respectively, with like magnetic poles opposed to each other; and
   at least two second permanent magnets for holding said lower frame at a predetermined position, with like magnetic poles opposed to each other;
   wherein a vertical movement of said upper frame relative to said lower frame is restrained by said first permanent magnets;
   wherein when a forward acceleration is inputted by sudden braking, said lower frame is moved forwardly by virtue of a single-sided pendulum motion about the instantaneous center of rotation thereof against a repulsive force of said second permanent magnets, so that a front side of said lower frame is lifted and a rear side of said lower frame is lowered, thereby restraining the forward acceleration; and
   wherein the forward movement of said lower frame lowers said upper frame relative to said lower frame, thereby restraining the forward acceleration.

4. The vibration isolator of claim 3 wherein said lower frame is movably mounted on the floor.

5. A vibration isolator mounted on a floor and having a front side and a rear side opposite to each other, said vibration isolator comprising:
   a lower frame;
   an arrangement that pivotally supports said lower frame relative to the floor, said arrangement defining an instantaneous center of rotation of said lower frame;
   an upper frame vertically movably mounted on said lower frame;

a link mechanism coupled to said upper and lower frames, operable to move said upper frame relative to said lower frame;

at least two permanent magnets secured to said upper and lower frames, respectively, with like magnetic poles opposed to each other; and longitudinal movement attenuators for holding said lower frame at a predetermined position;

wherein a vertical movement of said upper frame relative to said lower frame is restrained by said permanent magnets;

wherein when a forward acceleration is inputted by sudden braking, said lower frame is moved forwardly by virtue of a single-sided pendulum motion about the instantaneous center of rotation thereof against a biasing force of said longitudinal movement attenuators, so that a change in the distance between a front side of said lower frame and a front side of said upper frame differs from a change in the distance between a rear side of said lower frame and a rear side of said upper frame, thereby restraining the forward acceleration; and wherein the forward movement of said lower frame lowers said upper frame relative to said lower frame, thereby restraining the forward acceleration.

6. The vibration isolator of claim 5 wherein said lower frame is movably mounted on the floor.

* * * * *